Figure 1:
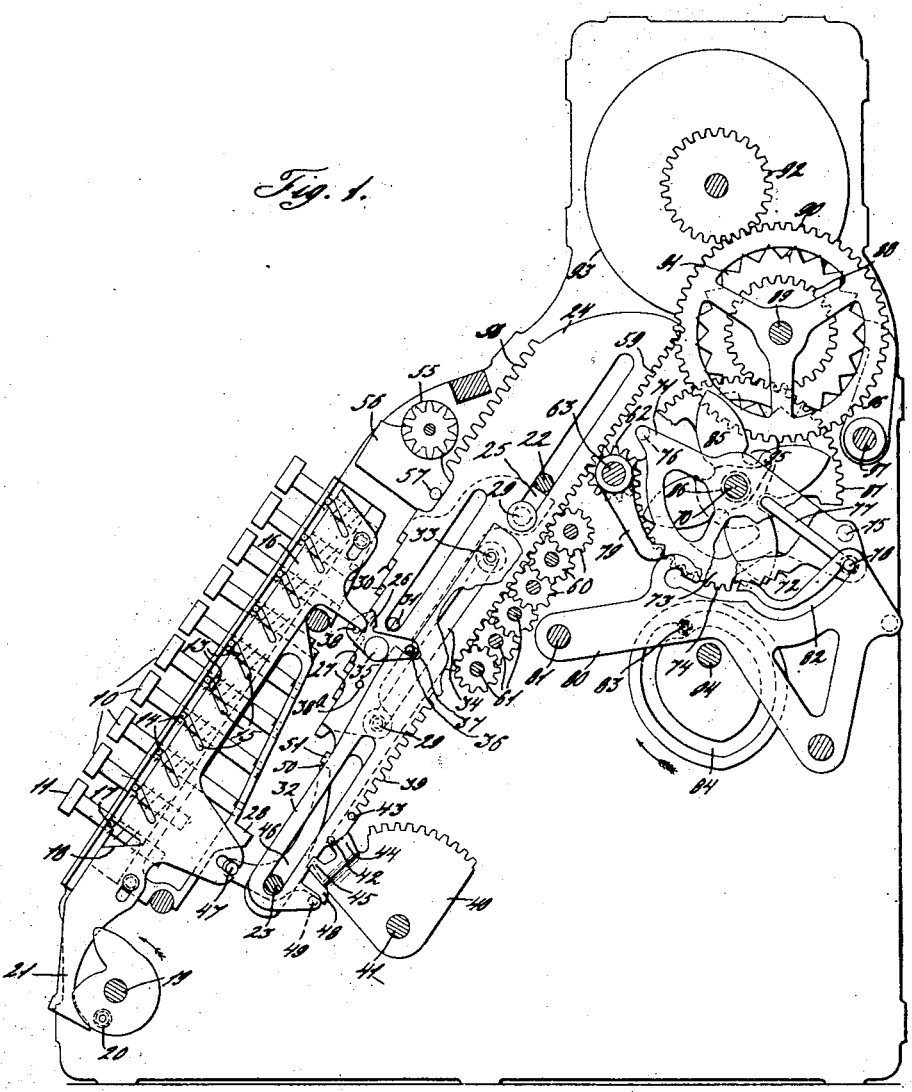

J. A. WERNER.
CASH REGISTER.
APPLICATION FILED MAY 25, 1907.

1,134,174.

Patented Apr. 6, 1915.
7 SHEETS—SHEET 1.

Witnesses

Inventor
John A. Werner
by J. B. Hayward
and R. C. Glass
Attorneys

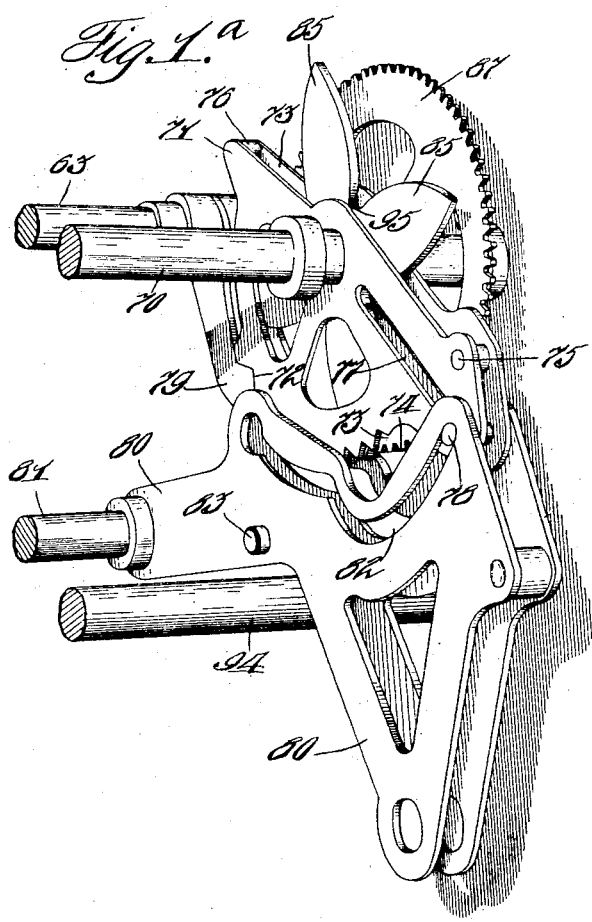

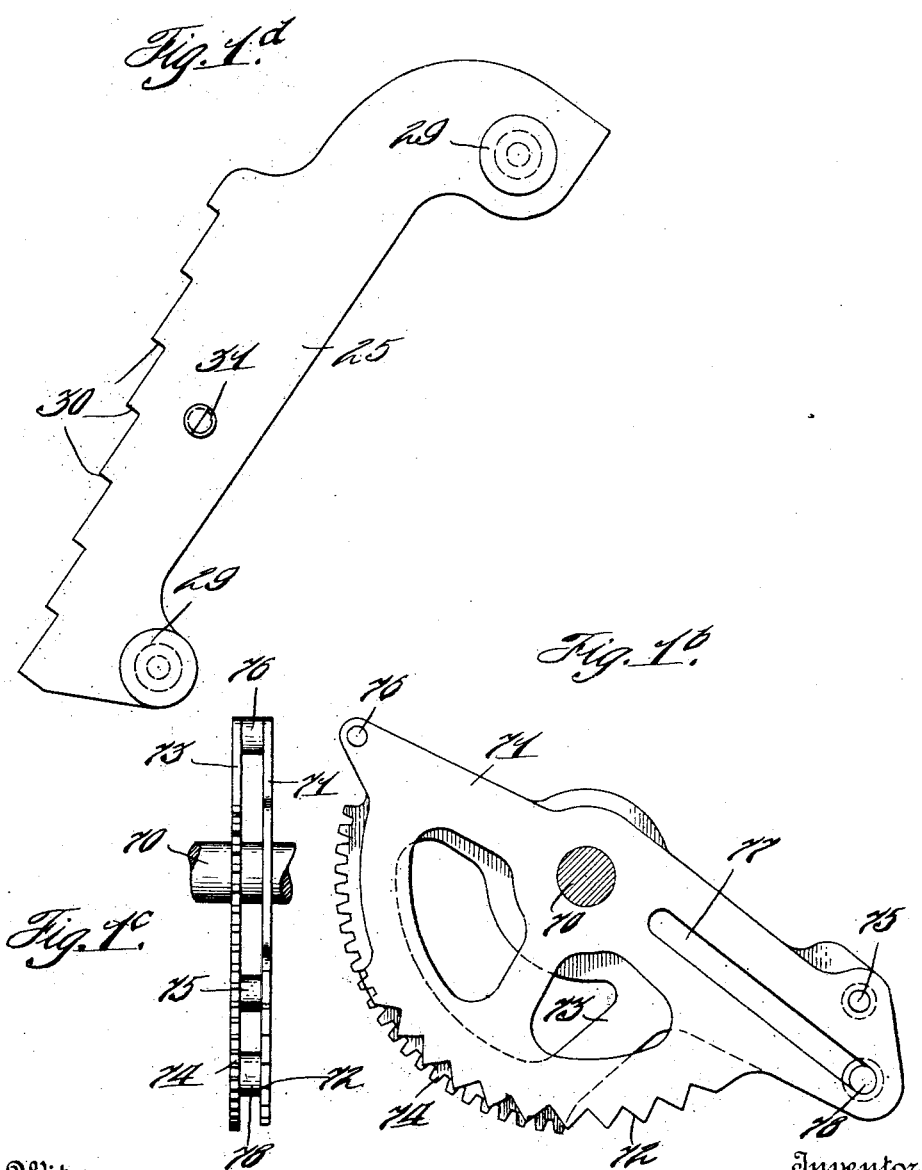

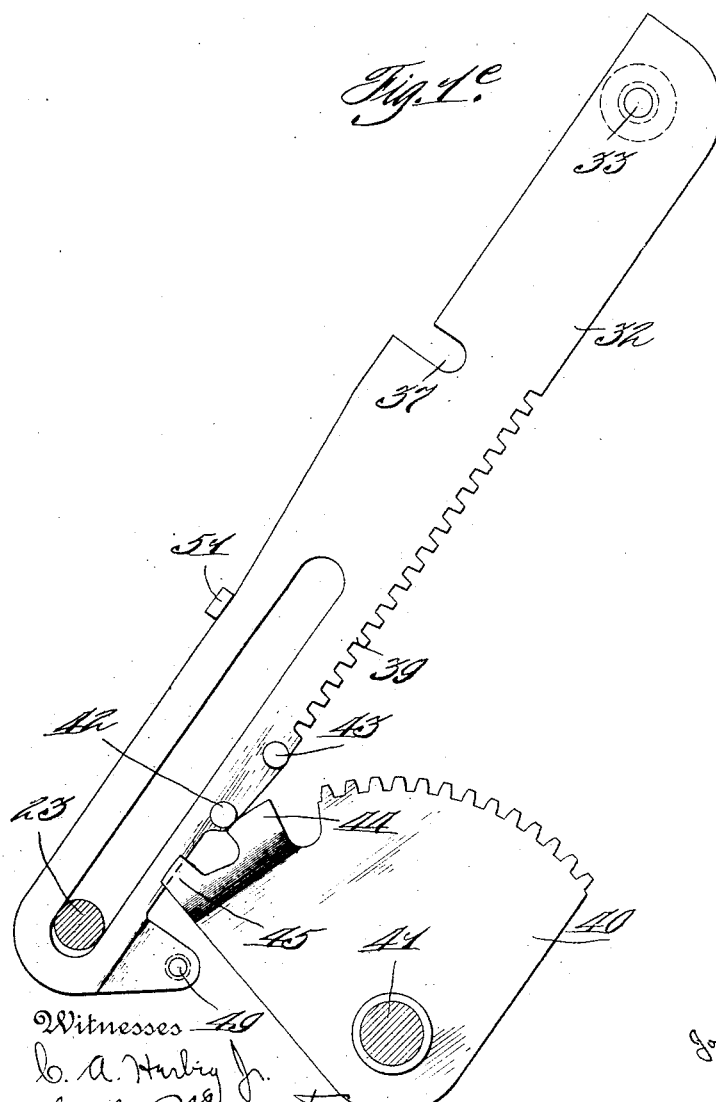

J. A. WERNER.
CASH REGISTER.
APPLICATION FILED MAY 25, 1907.
1,134,174.
Patented Apr. 6, 1915.
7 SHEETS—SHEET 5.
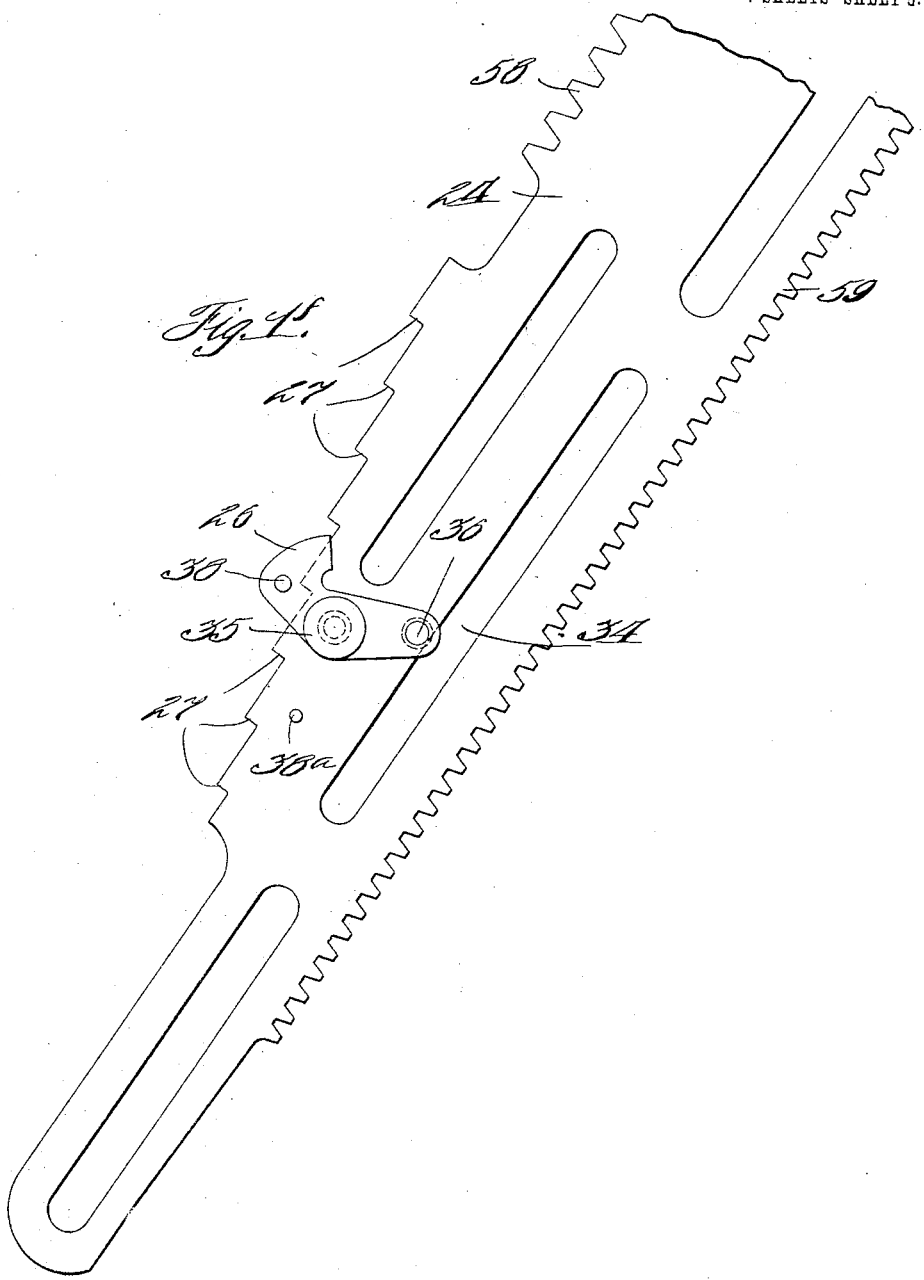
Witnesses
Inventor J. A. WERNER.
CASH REGISTER.
APPLICATION FILED MAY 25, 1907.
1,134,174.
Patented Apr. 6, 1915.
7 SHEETS—SHEET 6.
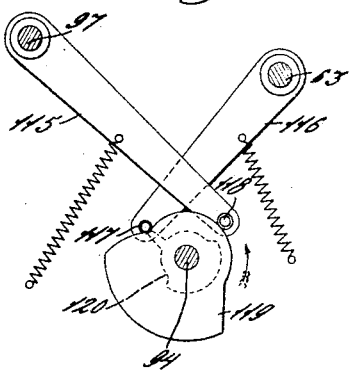
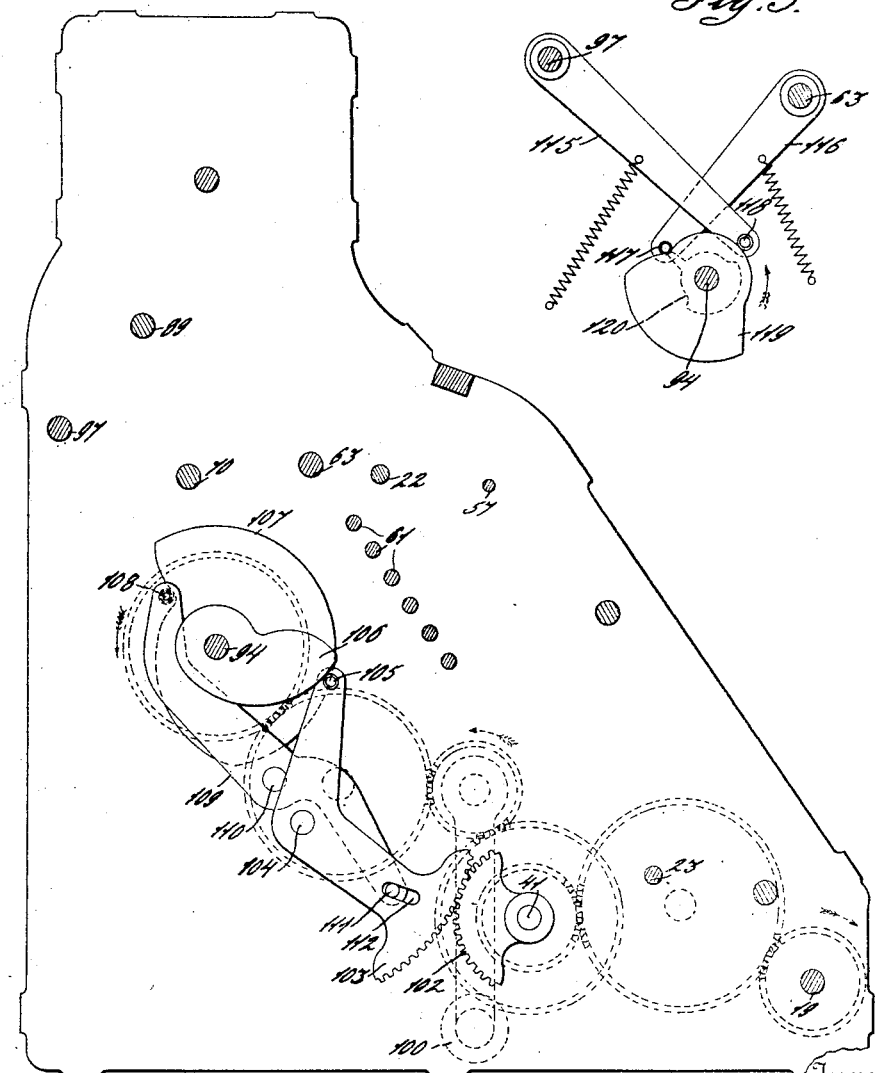

J. A. WERNER.
CASH REGISTER.
APPLICATION FILED MAY 25, 1907.
1,134,174.
Patented Apr. 6, 1915.
7 SHEETS—SHEET 7.
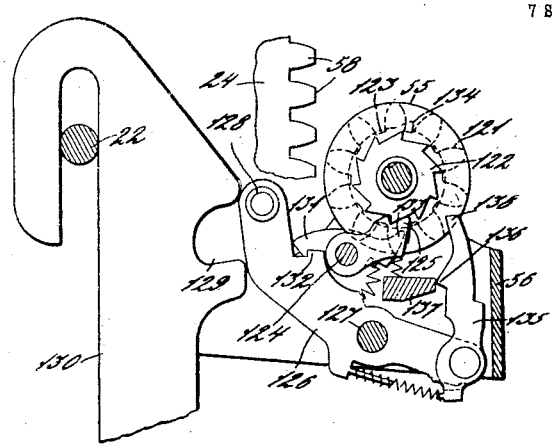
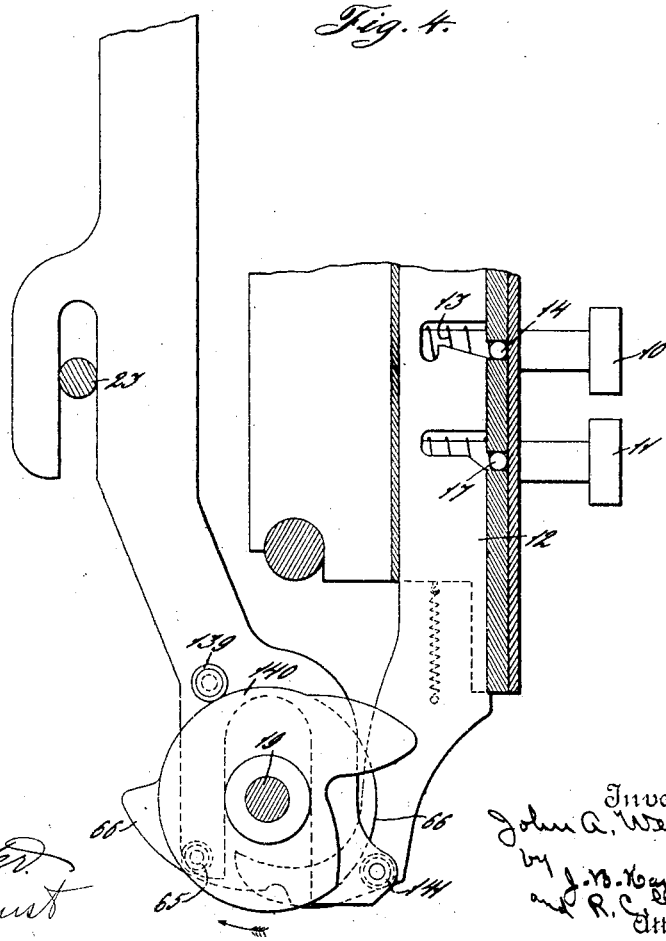
Fig. 4.
Witnesses
Inventor
John A. Werner
by J. B. Hayward
and R. C. Glass
Attorneys

UNITED STATES PATENT OFFICE.

JOHN A. WERNER, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,134,174.  Specification of Letters Patent.  Patented Apr. 6, 1915.

Application filed May 25, 1907. Serial No. 375,664.

*To all whom it may concern:*

Be it known that I, JOHN A. WERNER, a citizen of the United States, residing at Dayton, in the county of Montgomery and State of Ohio, have invented certain new and useful Improvements in Cash-Registers, of which I declare the following to be a full, clear, and exact description.

This invention relates to cash registers and has among its objects to provide an improved construction for the differential mechanism of a two motion machine.

A further object is to provide an improved construction of totalized operating elements with means for connecting them to and disconnecting them from an actuating mechanism having a constant excursion at each operation.

An additional object is to provide an improved indicating mechanism under the control of manipulative devices, which indicating mechanism will be directly set from a preceding to a subsequent position without being returned to a zero position, and will in all cases take the shorter path to its subsequent position.

With these and incidental objects in view, the invention consists in certain novel features of construction and combination of parts, the essential elements of which are set forth in appended claims and a preferred form of embodiment of which is hereinafter described with reference to the drawings which accompany and form part of this specification.

Of said drawings: Figure 1 is a vertical transverse section through the machine. Fig. 1ª is an enlarged view in perspective of the indicator setting mechanism. Figs. 1ᵇ and 1ᶜ are detail views of parts of the mechanism shown in Fig. 1ª. Figs. 1ᵈ, 1ᵉ, and 1ᶠ are enlarged detail views of the differentially movable registering mechanism. Fig. 2 is a section just inside of the right hand side frame showing the driving mechanism in dotted lines. Fig. 3 is a detailed view of the operating cams for the alining devices, and Fig. 4 is an enlarged detailed view of the counter and counter transfer mechanism.

The mechanism shown in this present application comprises part of a complete accounting mechanism, the part shown comprising the differential mechanism for operating the register, and the mechanism for indicating the amounts of transactions entered in the machine.

The complete machine will be shown in a separate application and will comprise printing devices controlled by the differential mechanism, and a plurality of separate totalizing devices, any of which may be connected at will with the differential totalizer operating mechanism, and from any of which a total may be printed.

Described in general terms the present invention comprises a series of banks of manipulative devices such as keys, only one bank being shown as an illustration in the present case. When any of the keys are depressed they serve to connect appropriate differentially movable totalizer operating slides to a main operating mechanism, the said slides remaining connected thereto until disconnected by the depressed keys against which the slides move. A totalizer operating slide carries two racks, one of which is adapted to engage with the appropriate totalizer wheel and operate it, and the other of which is adapted to engage with one of a series of pinions transmitting the movement of the slide to the operative planes of additional totalizing devices and also with a second pinion to which is geared the controlling mechanism for the indicators. When the controlling mechanism has been set to a desired position, the further operation of the machine will positively move the indicators to their new position but not as is usual in machines of this type, by first restoring them to zero and then resetting them to a new position. The indicators are set directly to the new position and always by the shorter of the two possible paths. In case no key is depressed in some particular bank, the registering slide is not connected to the operating mechanism but is retained in its zero position.

Referring to Fig. 1 it will be noted that there are ten keys in each bank. The first nine keys 10 are numbered on their outer ends from one to nine inclusive, the "one" key being at the top. These keys when depressed form stops for a differentially movable registering element as will hereafter be described. The bottom key 11 is a release key which when depressed serves to release any amount key 10 in its appropriate bank that has been operated by mistake. A locking detent 12 (see Fig. 4) is provided to lock the amount keys in their depressed position and is arranged to be operated at each operation, and also by the release key 11, to release any depressed amount key 10.

The keys are spring pressed to their outward position by springs 13, and the amount keys are provided with laterally projecting pins 14 which engage inclined slots 15 in a plate 16 to move said plate upward. A pin 17 projecting laterally from the release key 11 will (when said key is depressed) engage the inclined edge 18 of the plate 16 to return said plate to its normal position and positively restore the operated amount keys 10. Rigidly secured to a shaft 19 is a cam which is a part of a counter transfer mechanism to be referred to later, and mounted on said cam is an anti friction roller 20 adapted to engage a foot 21 of the plate 16 once during each operation of the machine, to operate said plate positively to return to normal position any of the keys 10 which have been depressed.

The operating mechanism of the machine comprises a plurality of segments 40 mounted rigidly on a shaft 41 by which they are given an oscillation through approximately ninety degrees, first downward and then upward at each operation. This oscillation is given by the mechanism shown in Fig. 2 driven by the main handle 100 and will be more fully described hereafter. When the keys are depressed the registering slides are allowed to move down slightly enough to be in position such that the segments 40 when they move downward will be connected thereto and will drive the slide through a constant excursion. Part of this motion is communicated to the stop slide carried by the main totalizer operating slide.

Mounted to slide upon two shafts 22 and 23 is the differentially movable totalizer operating mechanism, consisting of a totalizer operating rack bar 24, a trip slide 25, and a trip pawl 26. (See Figs. 1, 1$^d$, 1$^e$ and 1$^f$.) The rack bar 24 has eight steps 27 formed on its forward edge which are adapted to contact with the inner ends of the keys to limit the movement of the rack bar 24. It will be noted that the nine key is shorter than any of the other amount keys, and it will also be noted that a lug 28 is formed on the inner side of the key board which is directly in the path of the last step 27. Thus when the nine key has been depressed the downward movement of the rack bar 24 will be limited by the last step 27 coming into contact with the lug 28. When the eight key is depressed it will also limit the movement of said rack bar by coming into contact with the eight step, but as can be seen in Fig. 1, the rack bar 24 will have one more unit of movement when stopped by the lug 28 than when stopped by the eight key.

The trip slide 25 is provided with two pins 29 which ride in slots in the rack bar 24 and is also provided with a series of steps 30 which are of the same shape as the steps 27 but are normally a slight distance in advance of the steps 27. Mounted on the right hand side of the slide 25 and extending through a slot in the rack bar 24 is a pin 31 having a flattened surface which is adapted to be engaged by the face of the trip pawl 26. A driving rack 32 is slotted at its lower end to straddle the shaft 23 and is provided with a pin 33 which rides in a slot 34 in the rack bar 24. The trip pawl 26 is pivoted at 35 to the rack bar 24 and has mounted upon its rearward arm an anti friction roller 36 which engages a notch 37 formed in the forward edge of the driving rack 32. A pin 38 in the forward end of the trip pawl abuts a downward projection of the plate 16 which holds it and the driving rack 32 in their normal positions. A pin 38$^a$ limits the movement of the trip pawl in one direction. Gear teeth 39 are cut in the rear edge of the driving rack 32 and are adapted to be engaged by gear segment 40 pivoted upon a driving shaft 41. Two pins 42 and 43 are mounted upon the driving rack 32 and are operated upon by two projections 44 and 45 of the segment 40, as will be later explained.

A bellcrank latching lever 46 is loosely mounted upon the shaft 23 and has an anti friction roller 47 mounted upon a forward extension of said lever which is engaged and operated by a notch in the plate 16. A rearwardly extending arm 48 of the lever 46 engages a pin 49 mounted upon the driving rack 32 and an upwardly extending arm 50 of the lever 46 normally is positioned in the path of a lug 51 which is bent over from the forward edge of the driving rack 32. A series of gear teeth 59 are formed upon the upper rear edge of each rack bar 24 and engage with a gear pinion 60 mounted upon a shaft 61 which can be utilized to set up printing devices, segments, wheels or racks on the opposite side of the machine, there being as many pinions 60 and shafts 61 as there are rack bars 24 employed. A pinion 62 loosely mounted upon a shaft 63 transmits the differential movement of the rack bar 24 to the indicator mechanism which will be described later.

Only one set of actuating devices and totalizer operating elements have been described, but it will be readily understood that in the machine a plurality of banks of keys and elements corresponding thereto will be used, as many banks being employed as the limit of registration desired will compel. These additional banks are mere duplicates and consequently only one need be shown and described.

The operation of the machine as far as explained is as follows: The amount key 10 is depressed and is latched in its depressed position by its latching detent 12. During the inward movement of the key 10 the pin 14 of said key will operate the plate 16, holding it in its operated position until the depressed key is released. The upward movement of the detent 16 will rock the bellcrank lever 46, thereby carrying the arm 50 out of the path of the lug 51 and through the lug 48 and pin 49 will force the driving rack 32 downward until stopped by the face of the trip pawl coming into contact with the flat face of the pin 31. This will bring the pin 42 against the upper edge of the projection 45. The driving mechanism of the machine will now be started. First the totalizer 55 is thrown into mesh with the gear teeth 58. The space between the two projections 44 and 45 being larger than the diameter of the pin 42, it will be seen that the segment 40 has a slight movement before the under edge of the projection 44 strikes the pin 42 to operate the driving rack 32. During this slight movement of the segment 40, the totalizer is thrown into mesh with the rack bar 24. The projection 44 will now through the pin 42 force the driving rack downward and the pin 43 will in turn follow the upper edge of the projection 44 to keep the driving rack 32 from falling ahead of the segment 40. The gear teeth of the segment 40 will now mesh with the gear teeth of the driving rack and will drive said rack downward to the limit of its stroke. The anti friction roller 36 still being in engagement with the notch 37 of the driving rack will cause the trip pawl 26 and consequently the trip slide 25 and rack bar 24 to move with the driving rack 32. This downward movement of the rack bar 24 will cause the totalizer 55 to be operated, the pinion 62 to be rotated to set the indicator mechanism and the pinions and shafts 60 and 61 to be set. As soon as the trip slide 25 strikes a depressed key or the lug 28, the pin 31 will be held stationary and the driving rack 32 and the rack bar 24 will continue until the rack 24 is stopped by the key at which time the face of the trip pawl 26 will have passed off the flat face of the pin 31. The continued downward movement of the driving rack 32 will through the notch 37 therein rock the trip pawl 26 around its pivot until the anti friction roller 36 is free from said notch 37 after which the driving rack 32 will continue its downward travel alone and uninterrupted.

The segment 40 now remains at rest until the totalizer is thrown out of mesh, the transferring done and the indicators set. The segment 40 will now start to rock backward carrying the driving rack 32 with it. As soon as the lower edge of the notch 37 (which extends farther forward than its upper edge) reaches the anti friction roller 36 it will cause the trip pawl 26 to rock about its pivot until it assumes its normal position. At this point the pin 33 having reached the edge of the slot 34 of the rack bar 24 will carry said rack bar and its connecting mechanism back to their home positions. Just before the rack bar 24 reaches its normal home position, the key locking detent 12 is operated by an anti friction roller 65 mounted upon cam 66 on shaft 19 to release the depressed key. At the same time the upper edge of the projection 45 of the segment 40 will carry the driving rack 32 upward until the lug 51 thereon latches above the arm 50 of lever 46. The segment 40 will then have a slight forward movement to assume its normal position as shown in Fig. 1. The plate 16 is cammed to its home position by roller 20.

From the foregoing description it will be seen that the totalizing elements are given a differential motion as desired. The said elements will move downward until stopped by the depressed key, then allowed to remain in lower position during a part of the operation, and finally returned upward to their normal position. As the totalizer operating slides move downward they serve to differentially position a controlling segment for the indicator mechanism. The indicators are cylindrical in the present case and are positively geared to a radiaformed element herein shown as a star wheel against the sides of the so-called rays of which a sliding roller is adapted to be moved. (See Figs. 1, 1$^a$, 1$^b$ and 1$^c$.) When the roller support is rotated to the desired position, the roller is moved through a radial slot in the support and sooner or later engages one of the rays of the star wheel and rotates the said wheel to bring the indicator to the desired position. This mechanism provides for a very quick setting of the indicators without any danger of overthrow or of straining the parts. In cash registers as formerly constructed the indicators were returned to zero position and then reset to their new position so that if for example the previous registration had been eight and the new registration nine, the indicator would move through seventeen spaces. With the present construction, however, the indicator would be set directly, and in the case given would be moved only one space. In fact its maximum is five spaces, and this can take place with such slowness as to prevent any possibility of overthrow or undue straining of the parts.

The pinion 62 as before explained is given a differential rotation according to the key depressed. Pivoted on a shaft 70 is a frame consisting of a plate 71 which is provided with alining teeth 72 and a geared plate 73 whose teeth 74 mesh with the pinion 62. Pins 75 and 76 fasten the plates to form a rigid frame. Both of said plates are provided with slots 77 in which rides a loose roller 78 constituting a driver for indicator actuating mechanism. An alining pawl 79 is secured to the shaft 63 and meshes with alining teeth 72 to aline the plate 71 and consequently the plate 73. Plates 80 are pivoted at 81 and have in their upper edges slots 82 which surround the roller 78. An anti friction roller 83 is mounted on one of the plates 80 and is operated upon by a box cam 84 on a shaft 94 to elevate the plates 80 at each operation of the machine to cam the roller 78 upward in the slot 77. Mounted between the two plates 71 and 73 is a star shaped plate 85 having a series of recesses 95 intermediate its points is secured to short sleeve 86 on the shaft 70. On the other end of said sleeve is secured a gear wheel 87 which meshes with a smaller gear 88 pivoted on a shaft 89. To the gear 88 is secured a large gear wheel 90 and a toothed alining plate 91. Driven by the gear 90 through the medium of a gear 92 is the indicator 93 fast to the gear 92. Thus it will be seen that by rotating the star shaped plate 85 the indicator 93 will be rotated. The above described gearing is of such ratio that a quarter turn of the star shaped plate 85 will rotate the indicator one full revolution. Said plate 85 is rotated by the roller 78 being cammed upward by slotted plate 80 against its curved edges until said roller seats itself in one of the recesses 95. An alining pawl 96 is pivoted on a shaft 97 and is operated at each operation of the machine to aline the indicator through the alining plate 91 and its connecting gears 88, 90 and 92. From the above described mechanism it will be seen that the plates 71 and 73 are first rotated a distance depending upon the key depressed and then the roller 78 is cammed upward until it seats itself in one of the recesses 95, thus setting the indicator to the desired position. The direction of rotation of the star shaped plate 85 depends upon which side of one of its points the roller 78 is positioned before being cammed upward. This causes the indicator to always take the shorter direction in traveling to a new position.

It will readily be seen that if an indication of "9" is displayed by the machine and a succeeding indication of "1" is desired, the plate 71 will be adjusted to carry the roller 78 past the point of the star wheel 85 and upon being cammed upward will enter the succeeding quadrant of the star wheel and thus cause the indicator to advance two steps, passing the "0" and stopping at "1" instead of receding to "1" as in many well known forms of indicating mechanisms. If a succession of operations tend to carry the indicators forward to "9" and then over again to "1" and then again work upward it will be seen that the star wheel will continue to rotate in one direction. The necessity of providing the plurality of points of the star wheel is thus obvious. The driving mechanism for rotating the shafts 19 and 94 and for rocking the shaft 41 consists of the following mechanism. (See Fig. 2.) Rotary motion is transmitted from a revolving handle 100 through a train of gears (shown in dotted lines) to the two shafts 19 and 94. The shaft 41 has secured thereto a toothed segment 102 which is driven by a segment 103 pivoted at 104 and having on its upper end an anti friction roller 105 adapted to be engaged by a cam 106 secured to shaft 94. A cam 107 operates against an anti friction roller 108 of an arm 109 pivoted at 110 and having a pin 111 at its lower end engaging in a slot 112 in the segment 103. This arrangement will give the shaft 41 a rocking movement in each direction. This particular arrangement also permits a very fast operation of the machine without straining the parts on account of sharp camming points. To operate the alining pawls 79 and 96 the shafts 97 and 63 are provided with spring drawn arms 115 and 116 provided respectively with anti friction rollers 117 and 118 operated by two cams 119 and 120 on the revolving shaft 94.

The totalizer 55 consists of a series of totalizing wheels each having fast thereto a gear pinion 121, a ratchet wheel 122 and a transfer cam 123. Pivoted on a shaft 124 and meshing with the ratchet wheel 122 is a spring retaining pawl 125 to prevent retrograde movement of the totalizing wheels. A transfer arm 126 is pivoted at 127 and has on one end an anti-friction roller 128 adapted at certain times to be engaged and operated by a notch 129 of a transfer operating bar 130 which is mounted to slide upon the shafts 22 and 23. The transfer arm 126 is normally spring pressed toward its engaging position with the transfer operating bar 130 but is held from such position by a trip pawl 131 being hooked over a shoulder 132 of the transfer arm 126. The trip pawl 131 has an extension 133 which is in the path of a projection 134 of the transfer cam 123 and when operated upon by said projection will release the transfer arm 126 which will be forced into operative relation with the transfer operating bar 130. A spring pressed transfer pawl 135 is pivoted on one end of the transfer arm 126 and is provided with a shoulder 136 normally resting on a bar 137. The transfer pawl 135 has an operating nose 138 which when the tripping pawl 131 releases the transfer arm 126 will be spring pressed into operative relation with the ratchet wheel 122 of the totalizing wheel of the next higher bank and an anti-friction roller 128 will be rocked into the notch 129 of the transfer operating bar 130. The operating bar is so shaped as to straddle the shaft 19 and has mounted on one side an anti-friction roller 139 and on the other side an anti-friction roller 141. Upon the rotation of the shaft 19 the roller 141 will be engaged by the first projection of cam 66 on said shaft, and the bar 130 will thus be forced downward to rock the arm 126 and thus operate its respective ratchet wheel 122 to advance its adding wheel one step. The roller 139 will then be engaged by a second cam 140 also mounted rigidly on said shaft and the bar 130 will be raised sufficiently to "recock" the transfer arm 126, and after the raised portion of said cam 140 has passed said roller 139 the bar 130 will be "kicked" back to its normal position, as shown in Fig. 4, by the engagement of a second projection on cam 66 with roller 141.

The mechanism of the present invention has now been completely described and the operation will be clear from the description. The differential motion in this case is simple and positive in its action, the parts being practically all stampings which may be cheaply manufactured and very easily assembled. The totalizer operating slide is positively connected to the operating mechanism until disconnected by the depressed key, so that there is no possibility of overthrow or under registration being given. The indicator mechanism works easily and slowly and is therefore adapted to have a long life and constant, frequent and rapid operations without danger.
While the form of mechanism here shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is as follows:

1. In a cash register, the combination with manipulative devices, of mechanism differentially adjusted under control of said devices, an indicating mechanism, a star shaped element connected to said indicating mechanism, and means for moving said differentially adjusted mechanism to adjust said star shaped element.

2. In a cash register, the combination with manipulative devices, of mechanism differentially set thereby, an indicating mecha- nism, a device having radiating parts connected to said indicating mechanism, and means controlled by said differentially set mechanism for adjusting said device.

3. In a cash register, the combination with manipulative devices, of a register, devices controlled by said manipulative devices for determining the amount added on said register, an indicating mechanism, a star shaped mechanism for adjusting said indicating mechanism, and means adjusted by said amount determining means for moving said star shaped element in different directions.

4. In a cash register, the combination with a bank of keys, of a segment differentially set thereby, an indicator, a star shaped element connected to said indicator for adjusting same, and means adjusted by said segment and adapted to move radially of the same for engaging a ray of said star element and moving same to set said indicator.

5. In a cash register, the combination with manipulative devices, of an element differentially adjusted under control of said devices, indicating mechanism, and means effective at every operation of the machine to move the indicating mechanism in the direction requiring the shortest extent of adjustment.

6. In a cash register, the combination with manipulative devices, of an indicating mechanism, devices differentially adjusted under control of said manipulative devices, driving means for said indicating mechanism, and means under control of said adjustable devices for operating said driving means in a direction depending on the relative position of said adjustable devices and said driving means.

7. In a cash register, the combination with manipulative devices, of mechanism differentially adjustable under control of said devices, an indicating mechanism, means for driving said indicating mechanism, and means movable with the adjustable mechanism and adapted to engage and operate said driving means in a direction depending on the relative positions of said adjustable mechanism and said driving means.

8. In a cash register, the combination with an accounting mechanism, of a series of keys, and means controlling the differential positioning of said mechanism as determined by said keys; said means comprising a rack slide having a constant excursion, an accounting slide, a latch carried by said accounting slide for connecting same to said rack slide; said keys projecting into the path of said accounting slide, and serving to stop the same and to disconnect said latch.

9. In a cash register, the combination with an accounting mechanism, and a bank of manipulative devices controlling the differential positioning of said mechanism, of means for causing said differential positioning comprising; a rack slide having a constant excursion and means for driving same, an accounting slide mounted on said rack slide and carrying a latch connecting it to said rack slide, said accounting slide being moved toward the depressed manipulative devices and being stopped thereby.

10. In a cash register, the combination with an accounting mechanism, and a bank of manipulative devices controlling the differential positioning of same, of means for causing said differential positioning, said means including; a rack having a constant excursion at each operation, and means for driving same, an accounting rack carrying a latch connecting same to said first rack, said latch adapted to be disconnected by said manipulative devices, and an additional element carrying a projection which is engaged by said latch to compel a full movement of said accounting slide.

11. In a cash register, the combination with an accounting mechanism, of a bank of keys determining the differential positioning of same, an operating mechanism, a rack normally disconnected from said operating mechanism but adapted to be connected thereto by said keys and given a constant excursion, and an accounting rack carried by said first rack adapted to be engaged and stopped by a depressed key and serving to control the adjustment of said accounting mechanism.

12. In a cash register, the combination with an operating mechanism, of a driving rack normally disconnected from said mechanism, a bank of keys for connecting said driving rack to said operating mechanism, an accounting rack carried by said driving rack and movable therewith until stopped by the keys, and an accounting mechanism differentially positioned by said accounting rack.

13. In a cash register, the combination with an operating mechanism having a constant excursion at each actuation, of a driving rack normally disconnected from same, manipulative devices for connecting said rack to said mechanism, a registering slide movable with said rack until stopped by said manipulative devices, and a register controlled by said slide.

14. In a cash register, the combination with an operating mechanism, a bank of manipulative devices and an accounting mechanism; of a rack slide normally disconnected from said operating mechanism, with devices actuated by said manipulative devices for connecting said slide to said operating mechanism, an accounting slide moved by said rack slide until a manipulative device is struck, and a latch connecting said slides, an auxiliary slide carried by said accounting slide and carrying a pin coöperating with said latch; together with means for establishing an operative relation between said accounting slide and accounting mechanism.

15. In a cash register, the combination with manipulative devices, of mechanism differentially adjusted under control of said devices, and accounting means operated by said differential mechanism to a minimum extent at every operation of said mechanism to perform its function of accounting.

16. In a cash register, the combination with manipulative devices, of mechanism differentially adjusted under control of said devices, and accounting means movable in either direction and moved by said differential mechanism at every operation of the latter in the direction requiring the minimum extent of movement.

17. In a cash register, the combination with an accounting mechanism of manipulative devices, and means for operating said accounting mechanism to a minimum extent to adjust it to a position determined by the manipulative devices at each operation of the latter.

18. In a cash register, the combination with manipulative devices, of mechanism differentially set thereby, an accounting mechanism, a device having radiating parts and connected to said accounting mechanism and adapted to be moved in either direction, and means controlled by said differentially set mechanism for adjusting said device in the direction requiring the minimum extent of movement.

19. In a cash register, the combination with a totalizer comprising a plurality of elements, means for transferring from one element to another of said totalizer, an actuator for said transferring means, means for maintaining an inoperative relation between the transferring means and the actuator therefor, means for establishing an operative relation between same, and means for positively actuating the actuator to effect the transfer and then disestablish the operative relation between said actuator and the transferring means.

20. In a cash register, the combination with a totalizer comprising a plurality of elements, means for transferring from one element to another of said totalizer, and an actuator for said transferring means normally disengaged therefrom and constructed so that when engaged therewith it will effect the transfer and then move the transfer means out of operative relation therewith.

21. In a cash register, the combination with a totalizer comprising a plurality of elements, means normally inoperative for transferring from one element to another of said totalizer, means for rendering same operative, and an actuator for said transferring means constructed to effect the transfer when said means is in operative condition and then move same to its normal inoperative position.

22. In a cash register, the combination with a totalizer comprising a plurality of elements, means normally inoperative for transferring from one element to another of said totalizer, means for rendering same operative, an actuator for said transferring means constructed to effect the transfer when said means is in operative condition and then move same to its normal inoperative position, and means for positively operating the actuator.

23. In a cash register, the combination with a totalizer comprising a plurality of elements, means normally inoperative for transferring from one element to another of said totalizer, an actuator for said transferring means constructed to first effect the transfer when said means is in operative condition, second, to restore said transfer means to its normal inoperative position, and third to return to its normal position, and a plurality of cams for imparting the above described movements to said actuator.

24. In an accounting machine, the combination with an accounting device, of mechanism for differentially operating the accounting device constructed to adjust it to any setting in the direction requiring the least possible movement of the accounting device essential to such adjustment, and manipulative devices having connections to control said mechanism to operate the accounting device in the said manner.

25. In an accounting machine, the combination with a rotatable accounting device, of mechanism for differentially rotating the accounting device constructed to adjust it to any setting in the direction requiring the least possible movement of the accounting device essential to such adjustment, and manipulative devices having connections to control said mechanism to operate the accounting device in the said manner.

26. In an accounting machine, the combination with a rotatable accounting device, of mechanism for differentially rotating the accounting device constructed to adjust it from any setting to any other setting in the direction requiring the least possible movement of the accounting device essential to such adjustment, and manipulative devices having connections to control said mechanism to operate the accounting device in said manner.

27. In an accounting machine, the combination with a rotatable accounting element, manipulative devices, a differentially movable element controlled by said devices, a setting element for the accounting element geared to the accounting element and coacting with the differentially movable element, means for moving the differentially movable element and the setting element relatively for the purpose of setting the accounting element.

28. In an accounting machine, the combination with a plurality of driving racks, of means for reciprocating the racks including a shaft, segment gears fast on the shaft and meshing with the racks, an oscillatory segment gear, a cam coacting with said segment gear for driving it in one direction, a lever for driving the segment gear in the opposite direction, a cam for actuating said lever, and means for rotating said cams.

29. In a cash register, the combination with an accounting device, of an actuator for the accounting device, a driver for said actuator, means for differentially positioning said driver with respect to the actuator, and means for giving said driver an invariable stroke.

30. In an accounting machine, the combination of an accounting element, a cam connection therewith, and manipulative mechanism for differentially positioning the cam to set the accounting element at every operation thereof in the direction requiring the shortest extent of movement.

31. In an accounting machine, the combination of an accounting element, a series of keys, and a cam coöperating with the keys at every operation thereof to set the accounting element in accordance with the key depressed and in the direction requiring the shortest extent of adjustment.

32. In an accounting machine, the combination of a main operating mechanism, an accounting device; a cam connected with the accounting device; manipulative mechanism and an element operated by the operating mechanism for adjusting the cam and through it the accounting device, in accordance with the manipulation of the manipulative mechanism.

33. In an accounting machine, the combination with the determining member having a slot formed therein, of manipulative means for controlling the differential adjustment of said member, an accounting member, an element constructed to be moved an extent determined by the adjusted position of the determining member, and a device playing in said slot and having an invariable movement therein at each operation of the machine for adjusting said element to set the accounting element by the least possible movement of the latter.

34. In an accounting machine, the combination with the determining member having a slot formed therein, of manipulative devices for controlling the differential adjustment of said member, an element constructed to be moved an extent determined by the adjusted position of the determining member; and a device playing in said slot of said member and having an invariable extent of movement therein at each operation of the machine for moving the element an extent determined by the extent of adjustment of the determining member.

35. In an accounting machine the combination with a determining member having a slot formed therein, of manipulative means for controlling the differential adjustment of said member, an accounting member, an element constructed to be moved an extent determined by the adjusted position of the determining member, and a device playing in said slot for adjusting said element and thereby setting the accounting member by the least possible movement of it.

36. In an accounting machine, the combination with the determining member having a slot formed therein, of manipulative means for controlling the differential adjustment of said member, an accounting member, an element constructed to be moved an extent determined by the adjusted position of the determining member, a device playing in said slot and having an invariable movement therein at each operation of the machine for adjusting said element to set the accounting element by the least possible movement of the latter, and means for locking the determining member in adjusted position during the setting of said accounting member.

37. In an accounting machine, the combination with a determining member having a slot formed therein, of manipulative means for controlling the differential adjustment of said member, an element constructed to be moved an extent determined by the adjusted position of the determining member, an operating device, having a slot formed therein and movable to an invariable extent, and a device playing in said slots in the determinining and operating members for adjusting said element an extent determined by the adjusted position of the determining member.

38. In an accounting machine, the combination with the determining member having a slot formed therein, of manipulative means for controlling the differential adjustment of said member, an accounting element constructed to be moved an extent determined by the adjusted position of the determining member, an operating member having a slot formed therein and moved to an invariable extent, and a device playing in said slots in the determining and operating members to set the accounting element by the least possible movement of it.

39. In an accounting machine, the combination with a determining member having a slot formed therein, of manipulative means for controlling the differential adjustment of said member, an element constructed to be moved an extent determined by the adjusted position of the determining member, an operating device, having a slot formed therein and movable to an invariable extent, a device playing in said slots in the determining and operating members for adjusting said element an extent determined by the adjusted position of the determining member, and means for locking said determining member in adjusted position during movement of said element.

40. In an accounting machine, the combination with a determining member having a slot formed therein, of manipulative means for controlling the adjustment of said member, an element constructed to be moved an extent determined by the adjusted position of the determining member, an operating member having a slot formed therein, and a device constructed to be moved an invariable extent in the slot of the said determining member, and a variable extent in the slot in said operating member for moving said element an extent determined by the adjusted position of the determining member.

41. In an accounting machine, the combination with a determining member having a slot formed therein, of manipulative means for controlling the differential adjustment of said member, an accounting element constructed to be moved an extent determined by the adjusted position of the determining member, an operating member having a slot formed therein, and a device constructed to be moved an invariable extent in the slot of said determining member, and a variable extent in the slot of said operating member for setting the accounting element by the least possible movement of it.

42. In an accounting machine, the combination with a determining member having a slot formed therein, of manipulative means for controlling the adjustment of said member, an element constructed to be moved an extent determined by the adjusted position of the determining member, an operating member movable to an invariable extent and having a slot formed therein, and a device constructed to be moved an invariable extent in the slot of the said determining member, and a variable extent in the slot in said operative member for moving said element an extent determined by the adjusted position of the determining member.

43. In an accounting machine, the combination with a determining member, of manipulative means controlling the adjustment of said member, a device having an invariable extent of movement relative to said member, and an accounting element constructed to be operated in the direction requiring said device to any setting by the least possible movement of the accounting device essential to such adjustment.

44. In an accounting machine, the combination with the determining member, of manipulative means controlling the adjustment of said member, a device having an invariable extent of movement relative to said member, variable parts of said invariable movement being given to said device both during and after the adjustment of said determining member, and an accounting element constructed to be adjusted by said device to any setting by the least possible movement of the accounting device essential to such adjustment.

45. In an accounting machine, the combination with a differentially movable element, of a differentially adjustable determining member, a device having the same degree of movement relative to said member at each operation of the machine and normally in the same course and constructed to be deflected from its course by said determining member to adjust the movable element differentially.

46. In an accounting machine, the combination with an accounting element, of a differentially adjustable determining member, and a device having the same degree of movement relative to said member at each operation of the machine, normally in the same course and constructed to be deflected from its course by said determining member for moving said accounting element to a minimum extent at every operation of the machine to cause it to perform its function of accounting.

47. In an accounting machine, the combination with an indicator, of an operating device therefor having the same degree of movement in one direction at each operation of the machine and normally in the same course and a differentially adjustable member for deflecting the operating device from its normal course to effect movement of said indicator directly from one indicating position to another.

48. In an accounting machine, the combination with a differentially movable element, of a determining member having a slot formed therein, a device having an invariable movement in said slot, and means for adjusting the determining member so that the differentially movable member is in the path of movement of said device whereby said member is adjusted.

49. In an accounting machine, the combination with a differentially movable element, of a determining member having a slot formed therein, means for differentially adjusting said member so that the differentially movable element is across the slot in said member, a device playing in said slot and constructed to move idly therein until it contacts with the differentially movable element after which it moves said element differentially, and means for giving said device an invariable movement in said slot of every operation of the machine.

50. In an accounting machine, the combination with a differentially movable element, of an accounting element connected thereto, a determining member having a slot therein, means for differentially adjusting said member so that the differentially movable element is across the slot of said determining member, a device playing in said slot and constructed to move idly therein until it contacts with the differentially movable element after which it adjusts the differentially movable element to operate the accounting element to a minimum extent at every operation of the machine to perform its function of accounting, and means for giving said device an invariable movement in said slot.

51. In an accounting machine, the combination with a differentially movable element, of an accounting element connected thereto, a determining member having a slot therein, means for differentially adjusting said member so that the differentially movable element is across the slot of said determining member, a device playing in said slot and constructed to move idly therein until it contacts with the differentially movable element after which it adjusts the differentially movable element to operate the accounting element to a minimum extent at every operation of the machine to perform its function of accounting, means for giving said device an invariable movement in said slot, and means for locking said determining member in adjusted position during movement of said accounting element.

52. In an accounting machine, a combination with a main operating mechanism, of manipulative devices, mechanism differentially set by said devices, an indicating mechanism, a member having radiating parts and connected to said indicating mechanism, and means controlled by said differential mechanism and given an invariable extent of movement by the operating mechanism for adjusting said device.

53. In an accounting machine, a combination with a main operating mechanism, of manipulative devices, mechanism differentially set by said devices, an indicating mechanism, a member having radiating parts and connected to said indicating mechanism, and means controlled by said differential mechanism and given an invariable extent of movement by the operative mechanism for adjusting said device and thereby moving the indicating mechanism to a minimum extent at every operation of the machine to perform its function of indicating.

54. In an accounting machine, the combination with a digit carrier, of an actuator therefor constructed to move said digit carrier directly from one position to another, and means for first differentially adjusting the actuator in one constant direction and then moving it in another constant direction for the purpose of positioning the digit carrier.

55. In an accounting machine, the combination with a digit carrier, of an actuator therefor constructed to be differentially adjusted in one constant direction for the purpose of determining the movement to be imparted to the digit carrier and to be moved in another constant direction for the purpose of moving the digit carrier.

56. In an accounting machine, the combination with an indicator, of a member for rotating said indicator, an actuator for said member constructed to be differentially adjusted in one constant direction for the purpose of determining the movement to be imparted to the member, and means for moving the actuator in a constant direction different from that in which it was previously adjusted for the purpose of rotating the indicator directly from one position to another.

57. In an accounting machine the combination with an operating mechanism, of manipulative means operable as a preliminary to an operation of the operating mechanism, a digit carrier, of an actuator therefor constructed to move said digit carrier directly from one position to another, and means controlled by the manipulative means and operated by the operating means for first differentially adjusting the actuator in one constant direction and then moving it in another constant direction for the purpose of positioning the digit carrier.

58. In an accounting machine, the combination with a digit carrier, of an actuator therefor, constructed to move said digit carrier directly from one position to another, and means for first differentially moving the actuator in one direction and then moving it in another direction for the purpose of always moving the digit carrier to any position by the least possible movement of it.

59. In an accounting machine, the combination with an operating mechanism, of a driving rack normally disconnected from said mechanism, a plate for effecting the connection of said driving rack to said operating mechanism, depressible keys for moving said plate in one direction for this purpose and a member operated by said operating mechanism for moving said plate in the opposite direction to positively restore the keys to undepressed position.

60. In an accounting machine, the combination with a series of depressible keys, of a detent for locking said keys in depressed position, an operating mechanism, a driving rack normally disconnected from said mechanism, a plate moved in one direction by said keys for connecting said driving rack and said operating mechanism, and a member operated by the operating mechanism for moving said detent to release the depressed keys and for moving said plate in a direction opposite to its direction of movement by the keys to positively restore the depressed keys to undepressed position.

61. In an accounting machine, the combination with an accounting mechanism, of a bank of keys for determining the differential position of the same, an operating mechanism, a rack normally disconnected from said operating mechanism, a latch for normally preventing the rack from becoming engaged with said operating mechanism, a plate moved in one direction by said keys to disable said latch, an accounting rack carried by said first rack adapted to be engaged and stopped by a depressed key and serving to control the adjustment of said accounting mechanism, and a member operated by the operating mechanism for moving said plate in the opposite direction to positively restore the depressed keys to normal position.

62. In an accounting machine, the combination with an accounting mechanism, of a bank of keys for determining the differential positions of the same, an operating mechanism, a rack normally disconnected from said operating mechanism, a latch for normally preventing the rack from becoming engaged with said operating mechanism, a plate moved in one direction by said keys to disable said latch, an accounting rack carried by said first rack adapted to be engaged and stopped by a depressed key and serving to control the adjustment of said accounting mechanism, and a member operated by the operating mechanism for moving said plate in the opposite direction to positively restore the depressed keys to normal position, and for enabling said latch.

In testimony whereof I affix my signature in the presence of two witnesses.

JOHN A. WERNER.

Witnesses:
Roy C. Glass,
Carl W. Beust.